US012686073B2

(12) United States Patent
Munemura et al.

(10) Patent No.: US 12,686,073 B2
(45) Date of Patent: Jul. 21, 2026

(54) FRICTION ELEMENT WELDING METHOD

(71) Applicant: JFE STEEL CORPORATION, Tokyo (JP)

(72) Inventors: Naoaki Munemura, Tokyo (JP); Koichi Taniguchi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 19/136,057

(22) PCT Filed: Dec. 12, 2023

(86) PCT No.: PCT/JP2023/044455
§ 371 (c)(1),
(2) Date: Jun. 5, 2025

(87) PCT Pub. No.: WO2024/128228
PCT Pub. Date: Jun. 20, 2024

(65) Prior Publication Data
US 2026/0200006 A1 Jul. 16, 2026

(30) Foreign Application Priority Data
Dec. 13, 2022 (JP) ................................. 2022-198471

(51) Int. Cl.
*B23K 20/12* (2006.01)
*B23K 20/24* (2006.01)
*B23K 103/04* (2006.01)
(52) U.S. Cl.
CPC ............ *B23K 20/122* (2013.01); *B23K 20/24* (2013.01); *B23K 20/1295* (2013.01); *B23K 2103/04* (2018.08)

(58) Field of Classification Search
CPC .......... B23K 20/24; B23K 20/12–1295; B23K 2103/04
USPC .............................. 228/112.1–114.5, 2.1–2.3
See application file for complete search history.

(56) References Cited

U.S. PATENT DOCUMENTS

2020/0324363 A1* 10/2020 Abke .................... B23K 20/122
2024/0351133 A1* 10/2024 Yamagishi ............. B23K 20/12
2025/0065438 A1* 2/2025 Yamagishi ......... B23K 20/1225

FOREIGN PATENT DOCUMENTS

| CA | 2212250 A1 | * | 3/1999 | .......... B23K 20/121 |
| CN | 107160109 A | * | 9/2017 | .............. B23P 15/00 |
| CN | 110280887 A | * | 9/2019 | .............. B23P 19/02 |
| CN | 112157342 A | * | 1/2021 | ......... B23K 20/1235 |
| CN | 217412790 U | | 9/2022 | |

(Continued)

OTHER PUBLICATIONS

Mar. 4, 2026 Extended European Search Report issued in European Patent Application No. 23903512.4.

(Continued)

*Primary Examiner* — Kiley S Stoner
(74) *Attorney, Agent, or Firm* — Oliff PLC

(57) ABSTRACT

A friction element welding method for welding a sheet set that includes two or more overlapping metal sheets by pressing a rotating element having a tapered portion at a tip into the sheet set, the method includes a first step of removing a film of oxide on an upper surface of a lower sheet disposed as a lowermost layer of the sheet set, and a second step of pressing the rotating element into the lower sheet to form a welded portion.

4 Claims, 3 Drawing Sheets

(56) References Cited

FOREIGN PATENT DOCUMENTS

| | | | | | |
|---|---|---|---|---|---|
| DE | 102015216539 | A1 | | 3/2017 | |
| DE | 102018103991 | A1 | * | 8/2019 | .............. B21J 13/03 |
| EP | 2689882 | A2 | * | 1/2014 | ............. B29C 65/06 |
| EP | 4279209 | A1 | | 11/2023 | |
| JP | 2000-510768 | A | | 8/2000 | |
| JP | 2013-537804 | A | | 10/2013 | |
| JP | 6795124 | B2 | | 12/2020 | |
| JP | 7173376 | B2 | | 11/2022 | |
| WO | 02/062518 | A1 | | 8/2002 | |
| WO | WO-2008034563 | A1 | * | 8/2019 | ......... B23K 35/0288 |
| WO | 2022202788 | A1 | | 9/2022 | |

OTHER PUBLICATIONS

Jamie D. Skovron, Brandt J.Ruszkiewicz, and Laine Mears, "Investigation of the Cleaning and Welding Stepsfrom the Friction Element Welding Process". 2017.

Jan. 23, 2024 International Search Report issued in Internation Patent Application No. 2024/128227.

* cited by examiner

FIG. 2

FRICTION ELEMENT WELDING METHOD

TECHNICAL FIELD

The present disclosure relates to a friction element welding method for welding a sheet set including at least two overlapping metal sheets together by friction element welding.

BACKGROUND

In recent years, high-strength steel sheets called ultrahigh-strength steel sheets have been increasingly used in the automobile industry in order to achieve both safety and a reduction in environmental impact by reducing the weight of automobile bodies, and steel sheets having higher strength and better workability are expected to be developed in the future. However, one problem that occurs when fusion welding such as resistance spot welding is applied to steel sheets with increased strength and workability is a reduction in weld strength due to embrittlement of solidification microstructures. Therefore, attention is given to a non-fusion welding technique capable of welding a sheet set including at least two steel sheets including a high-strength steel sheet.

One example of the non-fusion welding technique that has been contemplated is FEW (Friction Element Welding) described in Reference Literature 1. In the FEW technique, an element rotating at high speed is pressed into a sheet set to weld the sheet set. For example, structures disclosed and proposed in Patent Literature 1 and Patent Literature 2 have been used for elements for the friction element welding (FEW).

Reference Literature 1

Jamie D. Skovron, Brandt J. Ruszkiewicz, and Laine Mears, "INVESTIGATION OF THE CLEANING AND WELDING STEPS FROM THE FRICTION ELEMENT WELDING PROCESS," (ASME 2017 12th International Manufacturing Science and Engineering Conference collocated with the JSME/ASME 2017 6th International Conference on Materials and Processing, Jun. 4-8, 2017 Los Angeles, California, USA)

Patent Literature 1 discloses an element having a structure in which a tip of a mandrel portion of the element (corresponding to a "connecting element" in Patent Literature 1) is a substantially flat end face and in which a pin-shaped centering part protrudes from the center of the flat end face. With the element having the structure described above, each connecting process can be performed with the pin-shaped centering part directed toward the intended connection site. In this manner, the frictional energy applied can be concentrated on the intended positions of the penetrating element.

Patent Literature 2 discloses a joint structure produced by welding a plurality of overlapping steel members using a connecting member having a shaft portion. In this joint structure, the maximum diameter of the boundary between the shaft portion and a second steel member disposed on the uppermost side is denoted as Dmax2, and the minimum diameter of the shaft portion at a position more distant from the second steel member than the measurement position of Dmax2 is denoted as Dmin. Then Dmax2 is at least 1.20 times Dmin.

CITATION LIST

Patent Literature

PTL 1: Japanese Unexamined Patent Application Publication (Translation of PCT Application) No. 2013-527804
PTL 2: Japanese Patent No. 6795124

SUMMARY

Technical Problem

Patent Literature 1 discloses only the shape of the pin at the tip of the mandrel portion of the element. However, in an actual welding process using the element, it is necessary to adjust the shape of the element according to the welding conditions, but the shape adjustment is not disclosed in Patent Literature 1.

One problem when oxide remains on the upper surface of the lower sheet that forms a welded portion together with the element is that the oxide is mixed into the welded portion and the soundness of the welded portion formed is impaired, so that the weld strength decreases. For the reason described above, it is necessary to remove the oxide (specifically an oxide film) on the upper surface of the lower sheet forming the welded portion together with the element during welding using the element. However, with the element described in Patent Literature 1, the area of contact between the pin-shaped centering part of the element and the steel sheets is small. A problem in this case is that the time required to remove the oxide on the steel sheet surface (the upper surface of the lower sheet) during the contact between the centering part and the steel sheet is long.

Patent Literature 2 describes the diameter of the connecting member (i.e., the diameter of the element) and the diameter of the welded portion, but the relation between the welding conditions and the shape of the connecting member is unclear. A problem in this case is that some of the welded members obtained do not have sufficient weld strength.

The present disclosure solves the foregoing problems, and an exemplary aspect of the disclosure provides a friction element welding method that can reduce the time for the welding process without being influenced by the sheet set and the chemical composition of the welding materials forming the sheet set and that can improve the weldability of the welded member obtained.

Solution to Problem

In the present disclosure, extensive studies have been conducted in order to solve the foregoing problems in the friction element welding method. The friction element welding method is a welding method in which the element rotating at high speed is pressed into a sheet set including two or more overlapping metal sheets (steel sheets) to weld the sheet set by friction element welding.

Another problem in addition to the problems described above is that, with a friction element welding method using an element having a conventional tip shape, although this element allows the upper and lower sheets to be welded, the time required for the tip of the element to reach a prescribed depth in the lower sheet is long. This causes excessive heat input into the welding materials, resulting in a reduction in the weld strength of the welded member obtained.

Accordingly, the inventors conducted the following experiments. A welding method including a friction element welding process including two or more steps was used. Metal sheets including ultrahigh-strength steel sheets and various elements having different tip shapes were used, and various pressurizing forces and various rotation speeds were used for different steps. Then the inventors have found that, by defining the optimal relation between the tip shape of the element and the pressurizing force in each step, the foregoing problems can be solved. As a result, the welding process can be accelerated, and a high-strength weld joint can be obtained.

Specifically, the process from when the element passes through the upper sheet in the sheet set to when the tip of the element rotating at high speed is brought into contact with the upper surface of the lower sheet and is then pressed into the upper surface of the lower sheet to form a welded portion is performed in at least two steps. More specifically, the step of bringing the tip of the element into contact with the upper surface of the lower sheet to press the element into the lower sheet to a prescribed position while an oxide film present on the upper surface of the lower sheet is removed is defined as a first step, and the step of further pressing the element into the lower sheet to form a welded portion is defined as a second step. In this case, the increase in the pressurizing force in the second step with respect to the pressurizing force in the first step (the increase is ΔP described later) is specified according to the penetration ratio (L/t described later) calculated from the distance from the position at which the pressing of the element into the lower sheet is started to the prescribed position in the first step and the tapering height of the tip of the element. In this manner, the overall welding time of the welding process is shortened. It has also been found that the influence of heat on the sheet set and the element is reduced and this is effective in suppressing the reduction in the weld strength.

The present disclosure has been made based on the above findings and is summarized as follows.

[1]A friction element welding method for welding a sheet set including two or more overlapping metal sheets by pressing a rotating element having a tapered portion at a tip into the sheet set, the method including a first step of removing a film of oxide on an upper surface of a lower sheet disposed as a lowermost layer of the sheet set and a second step of pressing the element into the lower sheet to form a welded portion, wherein, in the first step, the oxide on the upper surface of the lower sheet is removed while L/t, R1, and P1 are controlled such that 0.5≤L/t<1.3, 4000≤R1≤8000, and 4000≤P1≤8000, where P1 (N) is a pressurizing force in the first step, R1 (rpm) is a rotation speed in the first step, t (mm) is a height of the tapered portion, L (mm) is a cylinder displacement at the end of the first step, with a cylinder position when the tip of the element comes into contact with the upper surface of the lower sheet set to 0, and L/t is a penetration ratio obtained by dividing the cylinder displacement by the height of the tapered portion, wherein, in the second step, a pressurizing force in the second step is denoted as P2 (N), and an increase in the pressurizing force in the second step with respect to the pressurizing force in the first step is denoted as ΔP, and wherein the pressurizing force in the second step is increased such that the increase satisfies formula (1) when the penetration ratio L/t at the end of the first step is 0.5 or more and less than 0.7, that the increase satisfies formula (2) when the penetration ratio L/t at the end of the first step is 0.7 or more and less than 0.9, and that the increase satisfies formula (3) when the penetration ratio L/t at the end of the first step is 0.9 or more and less than 1.3:

$$\Delta P \geq 2 \times (2.5 - L) \times ((12000 - P1)/100)), \tag{1}$$

$$\Delta P \geq (3.6 - L) \times ((12000 - P1)/100), \tag{2}$$

$$\Delta P \geq 0.3 \times (9.9 - L) \times ((12000 - P1)/100). \tag{3}$$

[2] The friction element welding method according to [1], wherein the metal sheets are steel sheets, and the steel sheets have a tensile strength of 590 MPa or more.

[3] The friction element welding method according to [1] or [2], wherein the height of the tapered portion of the element is more than 0 mm and 1.0 mm or less, and the tapered portion has an elevation angle of 10 to 45°.

Advantageous Effects

The present disclosure provides a friction element welding method with improved weldability. With the welding method of the disclosure, metal sheets can be friction-element-welded based on an optimal relation between the shape of the tip of the element and the pressurizing force in each step. In this manner, the welding process can be accelerated (i.e., the welding time can be reduced), and high strength welding can be performed.

BRIEF DESCRIPTION OF THE DRAWINGS

FIG. 2 is a schematic illustration describing the friction element welding method of the disclosure.

DETAILED DESCRIPTION

The present disclosure will next be described. However, the disclosure is not limited to the following embodiments.

Figure 1:
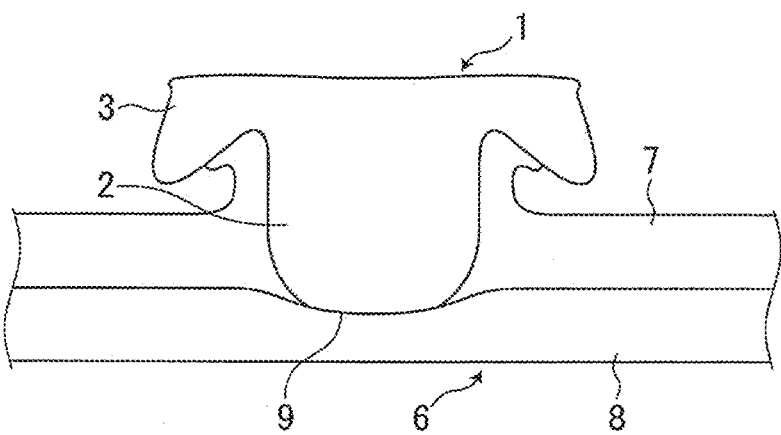
FIG. 1 is a schematic illustration showing an example of the state in which a sheet set including two metal sheets is welded by the friction element welding method of the disclosure.
Figure 2:
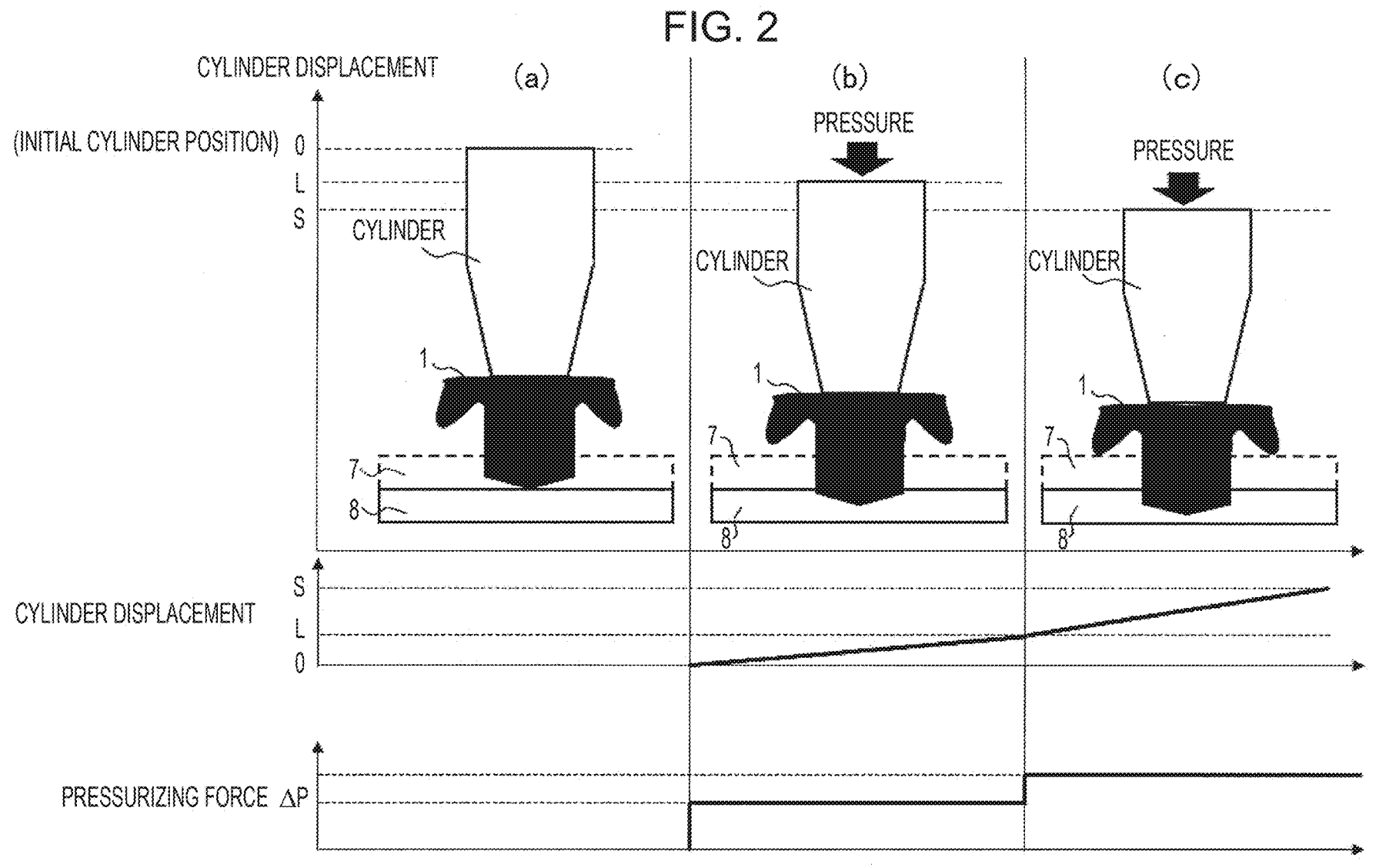
Figure 3:
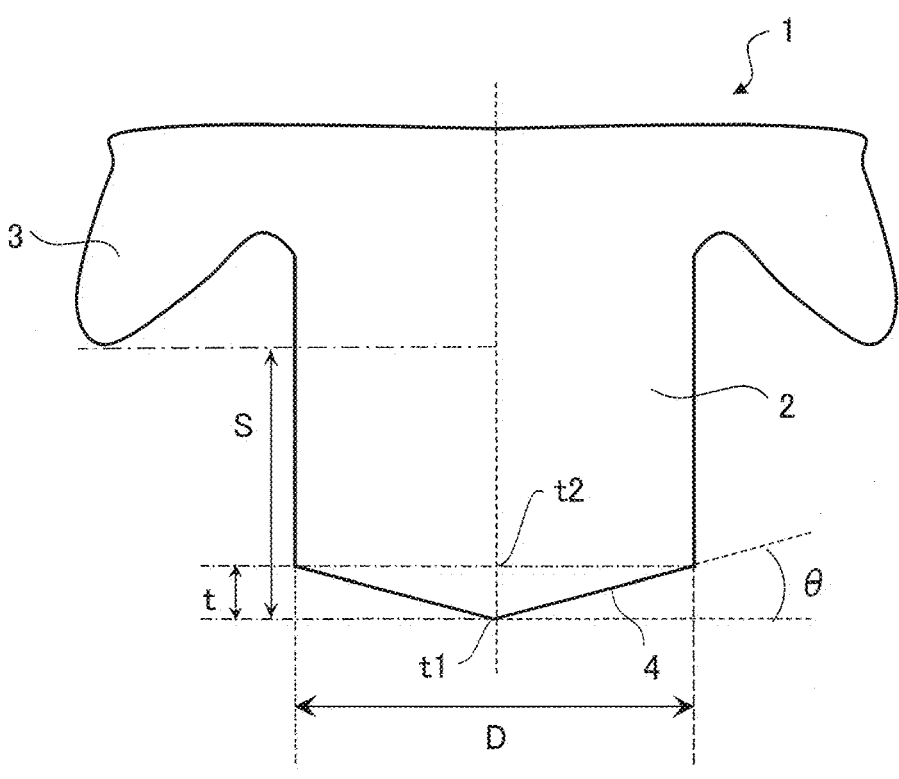
FIG. 3 is a cross-sectional view showing an example of the shape of the element used for the friction element welding method of the disclosure.

Referring first to FIGS. 1 to 3, a friction element welding method, which is an embodiment of the disclosure, will be described. FIG. 1 is a cross-sectional view showing an example of the state in which a sheet set including two metal sheets is welded by the friction element welding method of the disclosure. FIG. 2 is an illustration describing a cylinder displacement in each step in the disclosure. FIG. 3 is a cross-sectional view showing an example of the shape of the element used in the friction element welding method of the disclosure.

In the friction element welding method of the disclosure (which may be hereinafter referred to as the "welding method"), a rotating element having a tapered portion at its tip is pressed into a sheet set including two or more overlapping metal sheets to thereby weld the sheet set (see FIG. 1). The welding is friction welding using frictional heating. The "sheet set including two or more overlapping metal sheets" is a sheet set including two or more metal sheets stacked one on another.

As shown in FIG. 3, the element 1 used in the disclosure includes a mandrel portion 2 and a collar portion 3, and a tapered portion 4 is provided at the tip of the element (which may be referred to also as the "tip of the mandrel portion"). The tapered portion 4 is formed into a shape such that the height of the tapered portion (tapering height: t) and the elevation angle (taper angle: θ) of the tapered portion are as described later.

In the following description, two overlapping metal sheets are friction-element-welded. However, when three or more overlapping metal sheets are welded, the disclosure is also applicable, and the same effects can be obtained.

In the welding method of the disclosure, a process from when the element passes through the upper sheet to when the element is pressed into the upper surface of the lower sheet to form a welded portion is performed as at least two processes. A first process (i.e., a first step) is the step of removing an oxide film on the upper surface of the lower sheet, and a second process (i.e., a second step) is the step of pressing the element into the lower sheet to form a welded portion. The process includes these two steps. Specifically, the second step includes a process in which frictional heat is generated to plastically deform the contact surface between the tip of the element (i.e., the lower surface of the element) and the lower sheet and a welding process by pressure bonding.

For example, a "two-stage process" will be described. However, the above process can be divided into three or more processes.

In the present disclosure, the "upper sheet" is the uppermost metal sheet disposed on the uppermost side of the metal sheets (materials to be welded) forming the sheet set, and the "lower sheet" is the lowermost metal sheet disposed on the lowermost side of the metal sheets (materials to be welded) forming the sheet set. The upper sheet and the lower sheet may be, for example, plate-shaped members.

In the embodiment in the following description, a method for friction-welding metal sheets using the welding method of the disclosure including the first and second steps will be described in detail. In the following description, a sheet set including two overlapping metal sheets (an upper sheet and a lower sheet in this case) is used as shown in FIGS. 1 and 2.

Although not illustrated, the sheet set including the upper and lower sheets, which are plate-shaped members, is first placed on a support of a welding apparatus so as to face an element attached to the welding apparatus. A cylinder of the welding apparatus is brought into contact with the upper surface side of the element. The cylinder presses the element from above to press the element into the upper sheet. Next, a controller of the welding apparatus is used to adjust the rotation speed of the element. The rotating element comes into contact with the plate-shaped upper sheet, and a pressurizing force adjusted by the controller is applied to press the element into the upper sheet. In this manner, the upper sheet is plasticized due to frictional heat, and the mandrel portion of the element enters the upper sheet, and then the element pierces through the upper sheet. This step is referred to as an upper sheet piercing step. Then the lower surface of the element comes into contact with the upper surface of the lower sheet.

Next, the element rotating at high speed is pressed into the lower sheet, and the first step in the disclosure, i.e., the step of removing an oxide film on the upper surface of the lower sheet, is started.

[First Step]

In the first step, the tip of the element (i.e., the lower surface of the element) is brought into contact with the upper surface of the lower sheet to expel the oxide film present on the upper surface of the lower sheet.

By removing the oxide film, a fresh surface is exposed between the element and the upper surface of the lower sheet, and a sound solid phase welded portion can thereby be formed. To obtain this operational advantage, it is important to adjust (control) the shape of the tip of the element and the pressurizing force and rotation speed in the first step such that they satisfy optimal relations, as described above. Accordingly, in the present disclosure, the welding conditions in the first step are defined as follows.

Specifically, in the first step, the pressurizing force in the first step is denoted as P1 (N), and the rotation speed in the first step is denoted as R1 (rpm). The height of the tapered portion of the element is denoted as t (mm). The cylinder position when the tip of the element comes into contact with the upper surface of the lower sheet is defined as 0, and the cylinder displacement at the end of the first step is denoted as L (mm). The penetration ratio obtained by dividing the cylinder displacement by the height of the tapered portion is denoted as L/t. Then the oxide on the upper surface of the lower sheet is removed using the rotating element controlled such that the penetration ratio (L/t) is in the range of $0.5 \leq L/t < 1.3$, that the rotation speed in the first step is in the range of $4000 \leq R1 \leq 8000$, and that the pressurizing force in the first step is in the range of $4000 \leq P1 \leq 8000$.

Next, FIG. 2 is used to explain the cylinder displacement.

As shown in (a) in FIG. 2, the time when the tip of the element comes into contact with the upper surface of the lower sheet is the start time of the first step. The cylinder position at the first step start time (hereinafter referred to as the "initial cylinder position") is used as a reference position, and this reference value is set to "0."

After the start of the first step, while rotated with the pressurizing force P1 and the rotation speed R1 controlled to prescribed values within the above numerical ranges, the element is pressed from above by the cylinder into the lower sheet. When the cylinder is displaced to a preset length as shown in (b) in FIG. 2, the first step is ended. The displacement from the initial cylinder position at the end of the first step is the "cylinder displacement (L)" described above.

If the penetration ratio (L/t) is less than 0.5, the area of contact between the lower portion of the element and the upper surface of the lower sheet is insufficient, so that the oxide is not removed sufficiently. If the penetration ratio (L/t) is 1.3 or more, the element penetrates deep into the lower sheet, and the load on the apparatus may increase. Therefore, the penetration ratio is 0.5 or more and less than 1.3.

If the rotation speed is less than 4000 rpm, the heat generated is insufficient, and the plastic deformation may be inhibited. If the rotation speed is more than 8000 rpm, the heat generated is excessively large, and the element may be deformed. Therefore, the rotation speed in the first step is $4000 \leq R1 \leq 8000$.

If the pressurizing force (P1) in the first step is less than 4000 N, the penetration into the lower sheet may not be facilitated. If the pressurizing force (P1) in the first step exceeds 8000 N, the element enters while the heating is insufficient, so that the load on the apparatus may increase. Therefore, the pressurizing force in the first step is $4000 \leq P1 \leq 8000$.

In the present disclosure, the end of the first step is determined as follows. When the element is pressed in the thickness direction and the cylinder displacement reaches L, the controller determines that the removal of the oxide on the upper surface of the lower sheet is complete (see FIG. 2).

The subsequent second step is then performed.

[Second Step]

In the second step, the welded portion is formed by a friction welding process.

First, the element rotating at high speed is pressed into the lower sheet while the pressurizing force is adjusted by the controller (see (c) in FIG. 2). The friction welding process is thereby started. In the friction welding process, the tip of the element enters the lower sheet and generates frictional heat to cause plastic deformation of the lower sheet and the element. This process is referred to as a plastic deformation process. The tip of the mandrel portion of the element is connected to the lower sheet by friction element welding, and the material of the upper sheet extruded by the plastic deformation comes into contact with the upper portion of the element and is held by the collar portion.

In a subsequent pressure bonding process, mechanical bonding between the element and the two or more metal sheets forming the sheet set is achieved (see FIG. 1). Finally, the controller applies pressurizing force to the element with the rotation of the element stopped. In this manner, the material of the metal sheets extruded by the plastic deformation is pressure-bonded to the element, and the friction welding process is thereby completed.

As described above, in the second step, it is important to specify the increase in the pressurizing force in the second step with respect to the pressurizing force in the first step (the increase corresponds to $\Delta P$ described later) according to the penetration ratio of the element. Therefore, in the present disclosure, the welding conditions in the second step are specified as follows.

Specifically, in the second step, the pressurizing force in the second step is denoted as $P2$ (N), and the increase in the pressurizing force in the second step with respect to the pressurizing force in the first step is denoted as $\Delta P$. Then the pressurizing force ($P2$) in the second step is increased according to the cylinder displacement at the end of the first step such that the increase ($\Delta P$) satisfies formula (1) when the penetration ratio ($L/t$) is 0.5 or more and less than 0.7, that the increase ($\Delta P$) satisfies formula (2) when the penetration ratio ($L/t$) is 0.7 or more and less than 0.9, and that the increase ($\Delta P$) satisfies formula (3) when the penetration ratio ($L/t$) is 0.9 or more and less than 1.3.

$$\Delta P \ge 2 \times (2.5 - L) \times (12000 - P1)/100)) \tag{1}$$

$$\Delta P \ge (3.6 - L) \times ((12000 - P1)/100) \tag{2}$$

$$\Delta P \ge 0.3 \times (9.9 - L) \times ((12000 - P1)/100). \tag{3}$$

By appropriately changing the increase ($\Delta P$) in the pressurizing force in the second step with respect to that in the first step according to the penetration ratio ($L/t$) in the first step in the manner specified by the conditional formulas in the second step, the frictional heat by the rotation is utilized to facilitate the plasticization of the lower sheet. In this manner, the formation of the welded portion can be facilitated.

Specifically, when the penetration ratio ($L/t$) is 0.5 or more and less than 0.7, the plastic deformation action by the frictional heat can be obtained by increasing the pressurizing force ($P2$) in the second step such that the increase ($\Delta P$) satisfies formula (1). As a result, the welding is facilitated.

Preferably, the increase ($\Delta P$) is 150 or more, i.e., $\Delta P \ge 150$ in formula (1). No particular limitation is imposed on the upper limit of the increase ($\Delta P$) when the penetration ratio is within the above numerical range. Preferably, the upper limit of the increase ($\Delta P$) is 400 or less, i.e., $400 \ge \Delta P$ in formula (1). Otherwise, the frictional heat may be excessively large, and sound welding may not be achieved.

When the penetration ratio ($L/t$) is 0.7 or more and less than 0.9, the penetration of the element is larger than that when $0.5 \le L/t < 0.7$ described above. Therefore, the pressurizing force ($P2$) in the second step is increased more gently than that in formula (1) such that the increase ($\Delta P$) satisfies formula (2). When the penetration ratio is 0.7 or more and less than 0.9, if the increase ($\Delta P$) is less than the value of the right hand side of formula (2) (i.e., the value computed by "$(3.6-L) \times ((12000-P1)/100)$"), the plastic deformation action by the frictional heat cannot be obtained, and sound welding cannot be achieved. Preferably, the value of the right hand side of formula (2) is 120 or more, i.e., $\Delta P \ge 120$ in formula (2). No particular limitation is imposed on the upper limit of the increase ($\Delta P$) when the penetration ratio is within the above numerical range. Preferably, the upper limit of the increase ($\Delta P$) is 300 or less, i.e., $300 \ge \Delta P$ in formula (2). Otherwise, the frictional heat may be excessively large, and sound welding may not be achieved.

When the penetration ratio ($L/t$) is 0.9 or more and less than 1.3, the penetration of the element is large to some extent. In this case, if the pressurizing force ($P2$) in the second step is increased excessively, the influence of heat becomes large. Therefore, the increase in the pressurizing force is set to be much smaller than that in formulas (1) and (2) above. When the penetration ratio is 0.9 or more and less than 1.3, if the increase ($\Delta P$) is less than the value of the right hand side of formula (3) (i.e., the value computed by "$0.3 \times (9.9-L) \times ((12000-R1)/100)$"), the plastic deformation action by the frictional heat cannot be obtained, and sound welding cannot be achieved. Preferably, the value of the right hand side of formula (3) is 100 or more, i.e., $\Delta P \ge 100$ in formula (3). No particular limitation is imposed on the upper limit of the increase ($\Delta P$) when the penetration ratio is within the above numerical range. Preferably, the upper limit of the increase ($\Delta P$) is 250 or less, i.e., $250 \ge \Delta P$ in formula (3). Otherwise, the frictional heat may be excessively large, and sound welding may not be achieved.

When the displacement of the cylinder reaches the preset length ($S$) in the second step as shown in (c) in FIG. 2, the second step is ended. The increase ($\Delta P$) in the pressurizing force in the second step is determined by the penetration ratio ($L/t$) based on the cylinder displacement ($L$) at the end of the first step, and this pressurizing force (constant) is used for the processes described above.

With the welding method of the disclosure, the welding state between the element and the metal sheets forming the sheet set can be sound.

By changing the increase ($\Delta P$) in the pressurizing force in the second step according to the shape of the tip of the element and the penetration ratio ($L/t$) as described above, the welding process can be shortened, and sufficient weld strength can be ensured.

In the welding method of the disclosure, when a metal sheet having a through hole serving as a pilot hole is used as the upper sheet, the upper sheet piercing step is omitted. Specifically, the sheet set is placed on the support of the welding apparatus such that the overlapping metal sheets (i.e., the sheet set) face the element attached to the welding apparatus, and then the first step and the subsequent processes are performed.

In the present disclosure, metal sheets including an ultra-high-strength steel sheet can be used for the upper sheet 7 and the lower sheet 8. In the present disclosure, the "ultra-high-strength steel sheet" is a steel sheet having a tensile strength (TS) of 590 MPa or more. However, when an ultrahigh-strength steel sheet is used for the upper sheet, it is necessary to form the above-described through hole in advance.

Referring next to FIG. 3, an embodiment of the shape of the element used in the disclosure will be described. FIG. 3 is a lengthwise cross-sectional view obtained by cutting the element 1 so as to pass through its center.

By pressing the rotating element 1 into a sheet set including two or more overlapping metal sheets, the sheet set is friction-element-welded (see FIG. 1).

The mandrel portion 2 is disposed along the shaft center of the element 1, and its portion excluding the tip is formed into a cylindrical shape. The diameter of the cylindrical shape is the diameter (D) (mm) of the element. The tip of the mandrel portion 2 (i.e., the tip of the element) is inclined such that the tip protrudes and is formed into a conical shape. This conical portion is the tapered portion 4. As shown in the cross-sectional view in FIG. 3, the angle formed between a straight line perpendicular to the shaft center at the tip of the element and the tapered side surface (i.e., the tapered surface) of the tapered portion 4 is defined as the elevation angle ($\theta$)(°).

In the present disclosure, the elevation angle ($\theta$) is preferably 10 to 450 in order to facilitate the expulsion of the oxide. If the elevation angle ($\theta$) is less than 10°, the oxide discharging action may not be obtained. If the elevation angle ($\theta$) exceeds 45°, the area of contact between the lower portion of the element and the upper surface of the lower sheet may be small. The elevation angle is preferably 20° or more and preferably 30° or less.

As shown in the cross-sectional view in FIG. 3, in the tapered portion 4, the length from the position (t1) of the tip of the element to the intersection (t2) of the diameter of the bottom surface of the conical shape and the shaft center is defined as the height (t) (mm) of the tapered portion. In the present disclosure, to reduce the wobbling of the element during pressing into the upper surface of the lower sheet, the height (t) of the tapered portion is preferably more than 0 mm and 1.0 mm or less.

If the height (t) of the tapered portion is 0 mm, the tip of the element is a flat surface, and the oxide is not expelled. Specifically, the operational advantage of the disclosure is not obtained. If the height (t) of the tapered portion exceeds 1.0 mm, the tip has an acute angle. In this case, it is necessary to press the element deeper into the lower sheet in order to obtain a welded surface with approximately the same diameter as the diameter of the element. The height of the tapered portion is preferably 0.1 mm or more.

The total length S (mm) of the mandrel portion 2 is less than or equal to the total thickness of the metal sheets forming the sheet set 6. The total length S of the mandrel portion 2 may be appropriately adjusted such that the tip of the mandrel portion 2 can be welded to the lower sheet 8.

The collar portion 3 is disposed in an upper portion of the mandrel portion 2, i.e., at the head of the element 1. The collar portion 3 may be formed to have a wafer or torus shape as shown in FIG. 3. It is only necessary for the collar portion 3 to have a shape capable of holding the material of the upper sheet 7 extruded by plastic flow.

Figure 4:
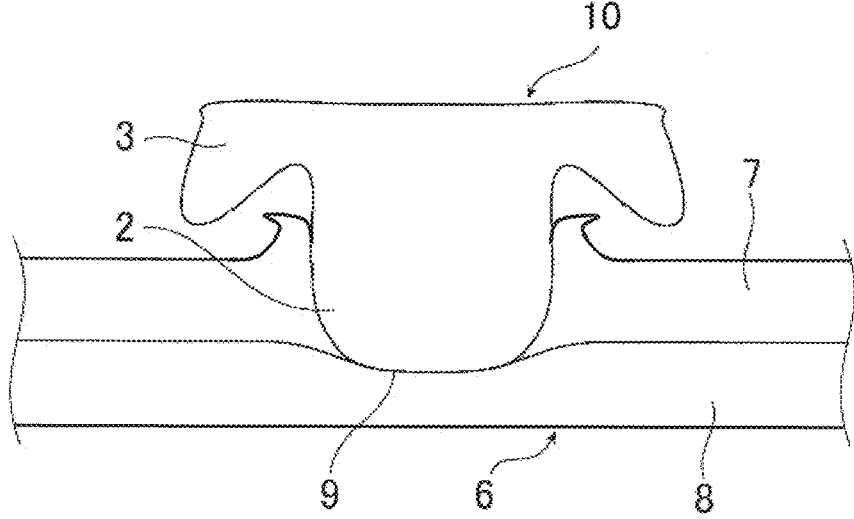
FIG. 4 is a schematic illustration showing an example of the state of welding using a conventional element.

Referring next to FIGS. 1 and 4, the welding state of the weld joint obtained will be described.

FIG. 1 shows an example of the state in which the element 1 in the disclosure is used to weld a sheet set including two metal sheets. FIG. 4 shows a conventional example of the state in which a conventional element 10 is used to weld a sheet set including two metal sheets. The above-described welding method of the disclosure is used as the welding method for both FIGS. 1 and 4. Each of FIGS. 1 and 4 is a thicknesswise cross-sectional view obtained by cutting the obtained weld joint so as to pass through the center of the element.

As shown in the conventional example in FIG. 4, when the conventional element 10 is used for welding by the welding method of the disclosure, the sheet set 6 including the two metal sheets (the upper sheet 7 and the lower sheet 8 in FIG. 4) is welded by the element 10. However, as shown in FIG. 4, although the upper sheet 7 and the lower sheet 8 are welded together by the element 10, a gap is present between the material of the upper sheet 7 plastically deformed and extruded during the welding process and the collar portion 3 disposed in the upper portion of the mandrel.

The present inventors have thought that the gap was caused by the step of removing the oxide film on the surface of the lower sheet in the friction element welding method. When a cross section of a welded portion of a weld joint in which the oxide film present on the upper surface of the lower sheet was not expelled sufficiently in the oxide film removal step was observed, the oxide from the oxide film on the upper surface of the lower sheet was found to remain at the joint interface between the element 10 and the lower sheet 8. Therefore, the welding state was not sound. This is because the time of the oxide film removal step was insufficient and the oxide film was not expelled sufficiently.

In the "conventional element" used, the tip of the mandrel portion of the element has a conical shape. However, the specifications of the tapered portion specified in the disclosure do not apply to the conventional element.

However, as shown in FIG. 1, when the element 1 having the tapered portion 4 described above (see FIG. 3) is used for welding by the welding method of the disclosure, the sheet set 6 including the two metal sheets (the upper sheet 7 and the lower sheet 8 in FIG. 1) is welded by the element 1. Specifically, in the sheet set 6 including the two plate-shaped members (i.e., the upper sheet 7 and the lower sheet 8), the tip of the mandrel 2 is connected to the lower sheet 8 by friction element welding, and the material of the upper sheet 7 plastically deformed and extruded in the welding process is held by the collar portion 3 disposed in the upper portion of the mandrel. In this manner, the metal sheets 7 and 8 are welded to the element 1.

As shown in FIG. 1, when the cross section of the welded portion in the element 1 was observed, the welding state was found to be sound. According to the present disclosure, the gap in the example shown in FIG. 4 is not present, as described later in Examples. This also shows that the amount of the remaining oxide can be reduced.

As has been described, in the present disclosure, when the element having the tapered portion with the height (t) described above is used to weld welding members, the welding is performed such that the increase ($\Delta P$) in the pressurizing force (P2) in the welding step for the friction welding process (i.e., the second step) with respect to the pressurizing force (P1) in the step of removing the oxide on the upper surface of the lower sheet, which is the upstream step of the second step (i.e., the first step), satisfies one of conditional formulas (1) to (3) according to the penetration ratio (L/t). In this manner, the tip of the element can be pressed into a prescribed depth while the heat input to the welding materials is suppressed. Therefore, according to the present disclosure, the reduction in the weld strength of the weld joint obtained can be smaller than that in the conventional element welding method. Moreover, a reduction in the time of the welding process can also be achieved.

EXAMPLES

To further facilitate the understanding of the present disclosure, the disclosure will be described by way of Examples. However, the following Examples do not limit the disclosure and are included in the technical scope of the disclosure so long as they satisfy the gist of the disclosure.

Metal sheets shown in the "Upper sheet" and "Lower sheet" columns in Table 1 were used as sample sheets. These sheets were stacked to prepare sheet sets. Each of the upper sheets used had been machined in advance to form a hole with $\phi 7$ mm. In the Examples, these sheet sets were used, and only the first and second steps were performed. Then evaluation described later was performed.

The first and second steps were performed using an element having a tip with a shape shown in Table 2, and the pressurizing force, the rotation speed, the cylinder displacement (L) were controlled as shown in Table 2. As for the shape of the element, the diameter (D) of the element was 4.55 mm, and the elevation angle ($\theta$) and height (t) of the tapered portion were set to values shown in Table 2 (see FIG. 3).

After completion of the second step, the following evaluation was performed.

[Evaluation of Fracture Morphology after Tensile Test]

A cross tensile test specified in JIS Z 3137 was performed, and the fracture morphology after fracture was examined. The fracture morphology was evaluated by observing the fracture surface in a region in contact with the element under an SEM (Scanning Electron Microscope). When the obtained area of the ductile fracture surface was larger than or equal to the area corresponding to the element diameter (D), an evaluation symbol "o (pass)" was assigned. If the area of the ductile fracture surface was smaller than the area corresponding to the element diameter (D), an evaluation symbol "x (fail)" was assigned. When the area of the ductile fracture surface was larger than or equal to the area corresponding to the element diameter, high weld strength is obtained.

[Evaluation of Reduction in Process Time]

The reduction in time from the start of the first step to the end of the second step in the disclosure was evaluated as follows.

In the Examples, the time required from the start of the first step to the completion of the second step is defined as the "time (s) required to complete the process (the required time)." In the Examples, the upper limit of the required time was set to 5 s. The "start of the first step" is the time at which the step of removing the oxide film on the upper surface of the lower sheet is started, and the "completion of the second step" is the time at which the friction welding process is completed.

When the required time was 0 s or longer and shorter than 2 s, an evaluation symbol "A" was assigned. When the required time was 2 s or longer and shorter than 3 s, an evaluation symbol "B" was assigned. When the required time was 3 s or longer, an evaluation symbol "C" was assigned. When the first and second steps were not completed within the upper limit time, an evaluation symbol "F" was assigned. The evaluation symbols "A" and "B" are passing ratings, with "A" being the best. The evaluation symbols "C" and "F" are failing ratings, with "F" being the worst. The evaluation results obtained are shown in Table 2.

In Examples (Nos. 7 and 14) in which the evaluation rating shown in the "Reduction in time" column in Table 2 was "-," the penetration ratio (L/t) was 1.3 and outside the ranges of the conditional formulas, and the process was not completed within 5 s, so that these Examples were not eligible for the evaluation and were Comparative Examples. Similarly, in Nos. 27 and 28, the penetration ratio (L/t) was not within the numerical ranges described above, and these Examples were not eligible for the evaluation and were Comparative Examples.

TABLE 1

| | Upper sheet | | | Lower sheet | | |
|---|---|---|---|---|---|---|
| Sheet set | Tensile strength (MPa) | Metal sheet | Thickness (mm) | Tensile strength (MPa) | Metal sheet | Thickness (mm) |
| A | 1470 | Ultrahigh-strength steel sheet | 1.6 | 1470 | Ultrahigh-strength steel sheet | 1.6 |
| B | 590 | Ultrahigh-strength steel sheet | 1.4 | 980 | Ultrahigh-strength steel sheet | 1.6 |

TABLE 2

| | | Shape of tip of element | | Penetration | | First step | | Second step | | Increase in pressurizing force | Conditional formula *1 | | Time required to complete process (s) | Evaluation | | |
| | | Height of tapered portion | | | | | | | | | | | | | | |
| No. | Sheet set | Elevation angle θ (°) | t (mm) | Cylinder displacment L (mm) | Penetration ratio L/t | Rotation speed R1 (rpm) | Pressurizing force P1 (N) | Rotation speed R2 (rpm) | Pressurizing force P2 (N) | ΔP | Formula *1 | Suitability | process (s) | Reduction in time | Fracture morphology | Remarks |
|---|---|---|---|---|---|---|---|---|---|---|---|---|---|---|---|---|
| 1 | A | 20 | 0.8 | 0.4 | 0.5 | 6500 | 7000 | 4000 | 7000 | 0 | Formula (1) | × | 3 | C | × | Comparative Example |
| 2 | A | 20 | 0.8 | 0.56 | 0.7 | 6500 | 7000 | 4000 | 7000 | 0 | Formula (2) | × | 3 | C | × | Comparative Example |
| 3 | A | 20 | 0.8 | 0.72 | 0.9 | 6500 | 7000 | 4000 | 7000 | 0 | Formula (3) | × | 4 | C | × | Comparative Example |
| 4 | A | 20 | 0.8 | 0.4 | 0.5 | 6500 | 7000 | 4000 | 7350 | 350 | Formula (1) | ○ | 1 | A | ○ | Inventive Example |
| 5 | A | 20 | 0.8 | 0.56 | 0.7 | 6500 | 7000 | 4000 | 7240 | 240 | Formula (2) | ○ | 1 | A | ○ | Inventive Example |
| 6 | A | 20 | 0.8 | 0.72 | 0.9 | 6500 | 7000 | 4000 | 7220 | 220 | Formula (3) | ○ | 2 | B | ○ | Inventive Example |
| 7 | A | 20 | 0.8 | 1.04 | 1.3 | 6500 | 7000 | 4000 | 7210 | 210 | — | — | — | — | × | Comparative Example |
| 8 | A | 20 | 0.8 | 0.4 | 0.5 | 6500 | 7000 | 8000 | 7000 | 0 | Formula (1) | × | 3 | C | × | Comparative Example |
| 9 | A | 20 | 0.8 | 0.56 | 0.7 | 6500 | 7000 | 8000 | 7000 | 0 | Formula (2) | × | 3 | C | × | Comparative Example |
| 10 | A | 20 | 0.8 | 0.72 | 0.9 | 6500 | 7000 | 8000 | 7000 | 0 | Formula (3) | × | 4 | C | × | Comparative Example |
| 11 | A | 20 | 0.8 | 0.4 | 0.5 | 6500 | 7000 | 8000 | 7275 | 275 | Formula (1) | ○ | 1 | A | ○ | Inventive Example |
| 12 | A | 20 | 0.8 | 0.56 | 0.7 | 6500 | 7000 | 8000 | 7220 | 220 | Formula (2) | ○ | 2 | B | ○ | Inventive Example |
| 13 | B | 20 | 0.8 | 0.72 | 0.9 | 6500 | 7000 | 8000 | 7210 | 210 | Formula (3) | ○ | 2 | B | ○ | Inventive Example |
| 14 | B | 20 | 0.8 | 1.04 | 1.3 | 6500 | 7000 | 8000 | 7210 | 210 | — | — | — | — | × | Comparative Example |
| 15 | A | 20 | 0.8 | 0.8 | 1.0 | 6000 | 7000 | 6500 | 7000 | 0 | Formula (3) | × | 3 | C | ○ | Comparative Example |
| 16 | A | 20 | 0.8 | 0.8 | 1.0 | 6000 | 7000 | 6500 | 7500 | 500 | Formula (3) | ○ | 1.5 | A | ○ | Inventive Example |
| 17 | A | 20 | 0.8 | 0.8 | 1.0 | 6000 | 7000 | 6500 | 7100 | 100 | Formula (3) | × | 3 | C | ○ | Comparative Example |
| 18 | A | 20 | 0.8 | 0.8 | 1.0 | 3500 | 6500 | 6500 | 7000 | 500 | Formula (3) | ○ | 4 | C | ○ | Comparative Example |
| 19 | A | 20 | 0.8 | 0.8 | 1.0 | 6000 | 3500 | 5000 | 3650 | 150 | Formula (3) | × | 1.9 | A | ○ | Inventive Example |
| 20 | A | 20 | 0.8 | 0.8 | 1.0 | 5000 | 6500 | 6500 | 6800 | 300 | Formula (3) | ○ | 1.8 | A | ○ | Inventive Example |
| 21 | A | 20 | 0.8 | 0.6 | 0.75 | 6000 | 7000 | 6500 | 7200 | 200 | Formula (2) | × | 3.5 | C | ○ | Comparative Example |
| 22 | A | 20 | 0.8 | 0.6 | 0.75 | 6000 | 7000 | 8000 | 7100 | 100 | Formula (2) | ○ | 1.5 | A | ○ | Inventive Example |
| 23 | A | 20 | 0.8 | 0.4 | 0.5 | 6000 | 7000 | 8000 | 7300 | 300 | Formula (1) | × | 4 | C | ○ | Comparative Example |
| 24 | A | 20 | 0.8 | 0.4 | 0.5 | 6000 | 7000 | 6500 | 7150 | 150 | Formula (3) | ○ | 1 | A | ○ | Inventive Example |
| 25 | A | 30 | 1.0 | 1.2 | 1.2 | 6000 | 7500 | 6500 | 7800 | 300 | Formula (3) | × | 4 | C | × | Comparative Example |
| 26 | A | 30 | 1.0 | 1.2 | 1.2 | 6000 | 7500 | 6500 | 7600 | 100 | Formula (3) | × | 4 | C | ○ | Comparative Example |
| 27 | A | 20 | 0.8 | 0.32 | 0.4 | 6000 | 7000 | 6500 | 7500 | 500 | — | — | — | — | × | Comparative Example |
| 28 | A | 20 | 0.8 | 1.12 | 1.4 | 6000 | 8000 | 6500 | 8500 | 500 | — | — | — | — | × | Comparative Example |
| 29 | B | 20 | 0.8 | 0.8 | 1.0 | 6000 | 7500 | 6000 | 8000 | 500 | Formula (3) | ○ | 1.8 | A | ○ | Inventive Example |
| 30 | B | 20 | 0.8 | 0.8 | 1.0 | 6000 | 7500 | 6000 | 7600 | 100 | Formula (3) | × | 4 | C | ○ | Comparative Example |

*1 Formula (1): ΔP ≥ 2 × (2.5 − L) × ((12000 − P1)/100)

Formula (2): ΔP ≥ (3.6 − L) × ((12000 − P1)/100)

Formula (3): ΔP ≥ 0.3 × (9.9 − L) × ((12000 − P1)/100)

As shown in Table 2, in all the Inventive Examples, a ductile fracture surface larger than or equal to the area corresponding to the element diameter could be obtained. According to the disclosure, the reduction in the weld strength of the weld joint obtained can be smaller than that with the conventional element welding method. Moreover, a reduction in the time of the welding process can be achieved.

REFERENCE SIGNS LIST

1, 10 element
2 mandrel portion
3 collar portion
4 tapered portion
6 sheet set
7 upper sheet
8 lower sheet
9 welded interface between the element and the lower sheet

The invention claimed is:

1. A friction element welding method for welding a sheet set that includes two or more overlapping metal sheets by pressing a rotating element having a tapered portion at a tip into the sheet set, the method comprising:

a first step of removing a film of oxide on an upper surface of a lower sheet disposed as a lowermost layer of the sheet set, wherein in the first step;

the oxide on the upper surface of the lower sheet is removed while L/t, R1, and P1 are controlled such that $0.5 \leq L/t < 1.3$, $4000 \leq R1 \leq 8000$, and $4000 \leq P1 \leq 8000$, where P1 (N) is a pressurizing force in the first step, R1 (rpm) is a rotation speed in the first step, t (mm) is a height of the tapered portion, L (mm) is a cylinder displacement at an end of the first step, with a cylinder position when the tip of the rotating element comes into contact with the upper surface of the lower sheet set to 0, and L/t is a penetration ratio obtained by dividing the cylinder displacement by the height of the tapered portion; and a second step of pressing the rotating element into the lower sheet to form a welded portion, wherein in the second step:

a pressurizing force in the second step is denoted as P2 (N), and an increase in the pressurizing force in the second step with respect to the pressurizing force in the first step is denoted as $\Delta P$, and the pressurizing force in the second step is increased such that the increase satisfies $\Delta P \geq 2 \times (2.5 - L) \times ((12000 - P1)/100))$ when the penetration ratio L/t at the end of the first step is 0.5 or more and less than 0.7, the increase in the pressuring force satisfies $\Delta P \geq (3.6 - L) \times ((12000 - P1)/100)$ when the penetration ratio L/t at the end of the first step is 0.7 or more and less than 0.9, and the increase in the pressuring force satisfies $\Delta P \geq 0.3 \times (9.9 - L) \times ((12000 - P1)/100)$ when the penetration ratio L/t at the end of the first step is 0.9 or more and less than 1.3.

2. The friction element welding method according to claim 1, wherein the two or more overlapping metal sheets are steel sheets, and the steel sheets have a tensile strength of 590 MPa or more.

3. The friction element welding method according to claim 1, wherein the height of the tapered portion of the rotating element is more than 0 mm and 1.0 mm or less, and the tapered portion has an elevation angle of 10 to 45°.

4. The friction element welding method according to claim 2, wherein the height of the tapered portion of the rotating element is more than 0 mm and 1.0 mm or less, and the tapered portion has an elevation angle of 10 to 45°.

* * * * *